Figures 1, 3:
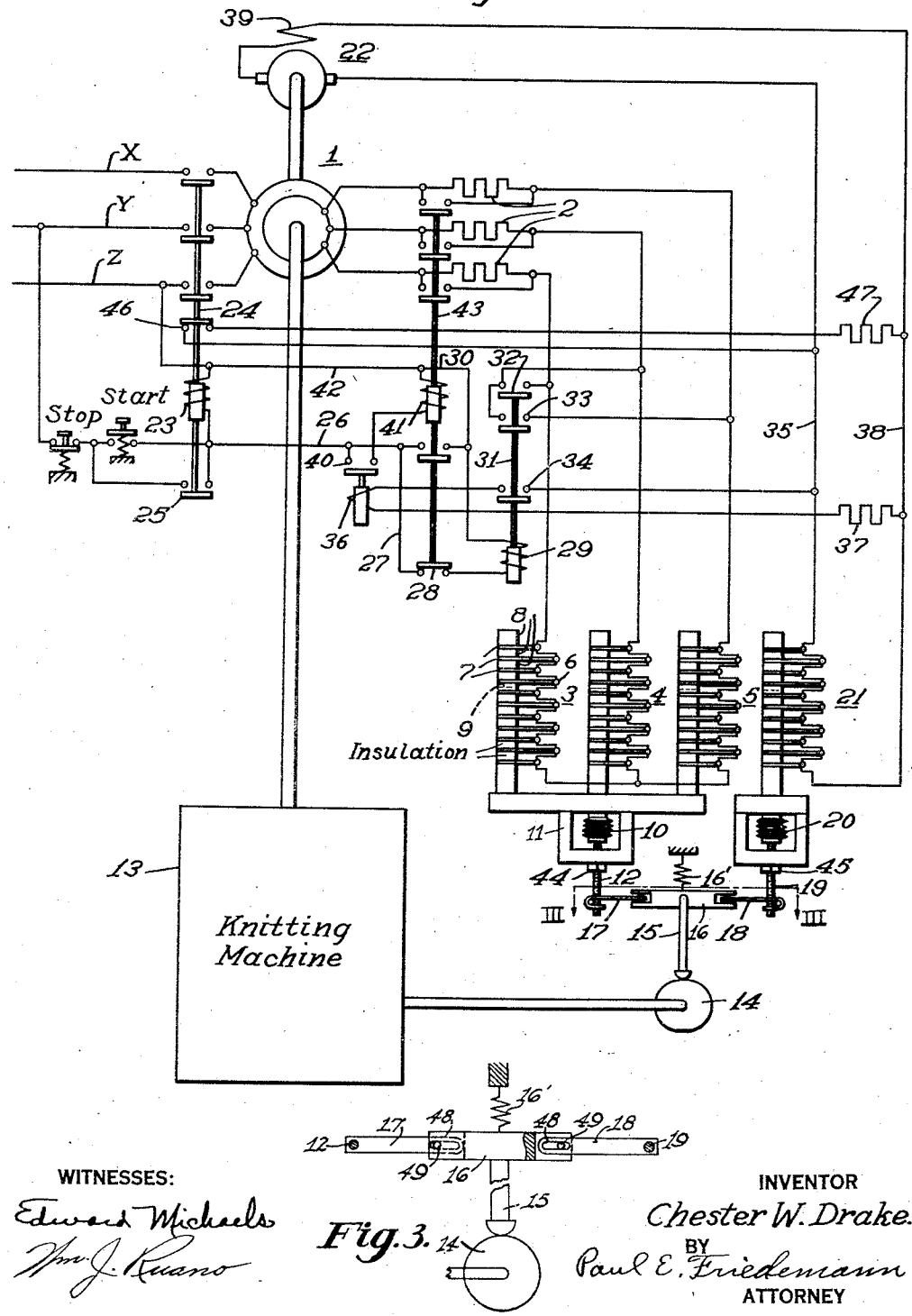

Sept. 7, 1943.                C. W. DRAKE                 2,329,110
                      INDUCTION MOTOR CONTROL SYSTEM
                   Filed April 11, 1941        2 Sheets-Sheet 1

WITNESSES:
Edward Michaels
Wm. J. Ruano

INVENTOR
Chester W. Drake.
BY
Paul E. Friedemann
ATTORNEY

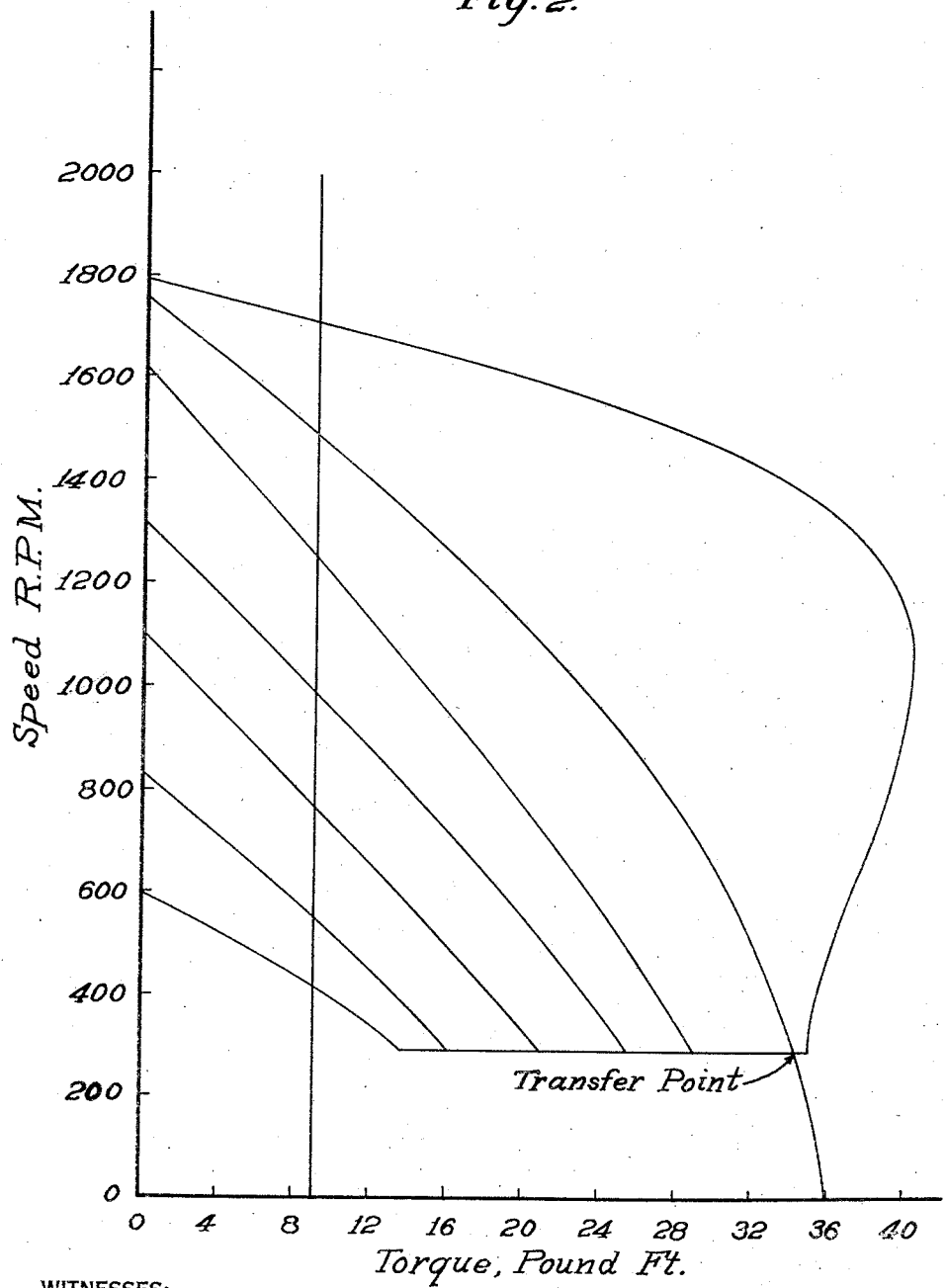

Patented Sept. 7, 1943

2,329,110

UNITED STATES PATENT OFFICE 2,329,110

INDUCTION MOTOR CONTROL SYSTEM

Chester W. Drake, Irwin, Pa., assignor to Westinghouse Electric & Manufacturing Company, East Pittsburgh, Pa., a corporation of Pennsylvania Application April 11, 1941, Serial No. 388,076

11 Claims. (Cl. 172—274)

My invention relates, generally, to variable speed machinery drives, and, more particularly, to a system of speed control for full-fashioned hosiery knitting machines.

My invention is an improvement on Patent No. 2,231,662, issued to C. W. Drake and W. R. Harding, and entitled "Hosiery machine drive."

In the operation of full-fashioned hosiery machines, it is necessary that the machine be driven at different speeds for the several different steps in the knitting process. A very low speed, approximately 10 to 15 percent of the normal highest knitting speed, is necessary while the machine is being started and while the welt is being turned. During the forming of certain parts of the hose, a wide variety of speeds such as between 450 and 1750 R. P. M. is required for the various operations.

While the number of knitting stitches per course is being reduced to produce a narrowing of the hose, a speed of approximately 35 to 50 percent of maximum knitting speed is required. This is known as the narrowing process and the speed is reduced from normal running speed only during the short interval necessary for reducing the number of stitches in the courses.

It is necessary that a high torque be maintained throughout the range of speeds and very considerable difficulty has been experienced in providing a drive system that will satisfy the desired speed and torque requirements.

An object of my invention is to provide a control system for an electric motor driven full-fashioned hosiery machine which shall function to provide a wide range of speeds while maintaining a high torque.

Another object of the invention is to provide a control system for an electrically driven full-fashioned hosiery machine which shall function to automatically govern the speed of the machine to provide the necessary speed for the several operations of the machine.

A further object of the invention is to provide a motor control system for an induction motor driven machine which shall function to provide a wide range of speeds for the machine while maintaining a desirable speed-torque characteristic at high, intermediate and low speeds.

These and other objects and advantages of the invention will be apparent from the following detailed description taken in connection with the accompanying drawings, in which Figure 1 is a diagrammatic illustration of a preferred embodiment of my invention showing the cooperative relationship of the several elements of the control system;

Fig. 2 is a chart showing the approximate speed-torque characteristics of a motor under control of the system shown in Fig. 1; and Fig. 3 is a sectional view taken substantially on the line III—III of Fig. 2.

A more specific object of my invention is to provide a liquid rheostat, having a multiplicity of points, connected in the rotor circuit of a wound rotor induction motor and by which rheostat it is possible to manually or automatically preset the motor speed to any one of a multiplicity of no-load speeds. A starting resistor is substituted for such liquid rheostat during starting. At the moment that a transfer relay is responsive to a predetermined speed of the motor, the liquid rheostat is substituted for the starting resistor.

A still more specific object of my invention is to provide a system as described in the preceding paragraph, together with a variable load means including a liquid rheostat which is operable by the same means which operates the rotor liquid rheostat, but in an inverse sense so that the loading is proportional to the speed of the motor.

My present invention constitutes an important improvement over the above mentioned Patent No. 2,231,662. One of the outstanding improvements is the elimination of large, cumbersome rheostats and the elimination of a large number of contactors resulting in considerable reduction in size of the entire control unit, together with a reduction in both initial cost and maintenance. Furthermore, instead of a limited number of preset, no-load speeds, I am able, by the use of a special mercury rheostat arrangement, to secure a multiplicity of no-load values of speed and at the same time, I am able to secure excellent speed regulation, irrespective of the particular working speed range selected.

While in the previously mentioned patent the resistor unit in series with the loading generator is placed in circuit only for a limited portion of the speed range, I have chosen in my present device to insert such resistor continuously throughout the entire operating speed range and to progressively vary in an inverse manner the resistance value thereof by the same automatic operating means which varies the value of the variable liquid rheostat in the rotor circuit of the motor.

These and other advantages will become more apparent from the description of the present device.

Referring to Figure 1 of the drawings, numeral 1 denotes an induction motor, preferably of the wound rotor type, having connected in series with the rotor winding a plurality of starting resistors 2 (or other suitable impedance devices) and a plurality of variable resistance liquid rheostats denoted generally by numerals 3, 4, and 5. Each of these liquid rheostats is of the same general construction. Rheostat 3, for example, comprises a resistor 6, having a plurality of taps to which are connected a plurality of metallic plates 7, each having a left hand end portion in the shape of an annulus or eyelet. These plates have their eyelet portions stacked together with alternate rings of insulating material 8 with which rings they form a cylindrical chamber. The chamber contains a column of liquid metal such as mercury having a variable heighth, as indicated by dotted lines 9. The operating portion of the chamber is relatively small in diameter, say about ⅛ inch. Each of the mercury rheostats 3, 4, and 5 has its metallic liquid in communication with the interior of a bellows 10, preferably of metal, which bellows is mounted on a base or support 11. A screw-threaded rod 12, threadedly engages the support 11, and when turned in one direction, will push against the lower end of the bellows to decrease its volume and thus to raise the level of the mercury in each of the mercury rheostats 3, 4, and 5, and when turned in an opposite direction, will increase in volume, thereby decreasing the level of mercury in each of said rheostats. A small movement of the bellows will result in a comparatively large change in the mercury level. Mechanically coupled to the rotor of motor 1 is a knitting machine denoted schematically by numeral 13. The specific operation of the knitting machine, per se, forms no part of my present invention. As is well known in the art, knitting machines, such as used for knitting full-fashioned hosiery, have patterns which may be set up, which control the rotation of a plurality of cams such as cam 14. A single cam is shown for the sake of simplicity, since one cam is sufficient to show the theory of operation of my invention. Such cam, by any suitable motion transmitting mechanism, is effective through a suitable push-rod 15 to push a link member 16 in a direction at right angles to the plane of the drawing, push-rod 15 being schematically shown in Fig. 1. Actually, it will be perpendicular to link member 16, as shown in Fig. 3, in order to secure motion at right angles to the plane of the drawing. A suitable spring as 16' may be used to maintain the cam 14, the push-rod 15, and link member 16 in continuous engagement. At each end of the link member, there are pivotally mounted connecting members 17 and 18, each of which has one end rigidly secured to the lower end of the corresponding screw-threaded shaft such as 12, and the other end pivotally mounted to the link member 16. It will, therefore, become apparent that as the link member 16 is pushed into the plane of the drawing by the protuberances of the cam 14, it will effect rotation of a threaded shaft 12 in one direction and rotation of a similar threaded shaft 19 in an opposite direction. Associated with threaded shaft 19 is a bellows 20, similar to bellows 10, and a mercury rheostat 21 similar to rheostats 3, 4, or 5. It will thus be seen that as the level of the mercury in rheostats 3, 4, and 5 is raised, the level of mercury in rheostat 21 is simultaneously lowered. It will be readily understood, of course, that threaded shafts 12 and 19 could instead be reversely threaded, in which case, a motion for rotation of both of these shafts in the same direction would accomplish the same inverse movement of mercury in rheostats 3, 4, and 5, as compared to that in rheostat 21. Rheostat 21 is in series relationship with a direct current generator 22 which is mechanically coupled to motor 1 and which constitutes a variable loading device for the motor.

The manner in which the push-rod 15 and link 16 cooperate to impart reverse movements to the threaded control shafts 12 and 19 is best shown in Fig. 3. The ends of the link 16 are bifurcated as best shown in Fig. 2, each of such bifurcated ends being adapted to receive an end of one of the connecting members 17 and 18. The ends of the members 17 and 18 positioned within the bifurcations are provided with elongated slots 48 through which are passed pins 49 carried by the link 16. By reason of this construction, it will be apparent that the members 17 and 18 will be pivotally moved in opposite directions upon movement of the link 16 by the push-rod 15 toward or away from the cam 14. Since the members 17 and 18 are respectively secured to the shafts 12 and 19, it will further be apparent that such shafts will be rotated in opposite directions to effect a control as explained above upon pivotal movement being imparted to the members 17 and 18.

Leads X, Y, and Z denote three-phase alternating current supply buses for energizing the stator winding of motor 1.

The operation of the device is as follows:

When the "start" pushbutton is depressed, a circuit will be completed from bus Y through the "stop" and "start" pushbuttons through actuating coil 23, to the bus Z. Contactor 24, thereby becomes actuated or picks-up, thus completing an energizing circuit between buses X, Y, and Z, and the stator winding of motor 1 and effecting closing of the interlock contact members 25 which establish a holding circuit, as shown, to maintain the above-mentioned circuit complete, irrespective of subsequent release of the "start" pushbutton (which is spring biased to the open position) in a manner well known in the art.

Another energizing circuit will be completed from bus Y through the "stop" and "start" pushbuttons, conductors 26 and 27, contact members 28, relay coil 29, conductor 30, to bus Z. Contactor 31 will thereby pick up and effect closing of its contact members 32 and 33 which will effect a shunting out of all sections of the three mercury rheostats 3, 4, and 5. Actuation of contactor 31 will also effect closing of contact members 34 which will complete a generator series circuit from conductor 35 through contact members 34, transfer relay 36, resistor 37, to conductor 38 and the series field 39 of the generator 22. It will, therefore, become apparent that as the motor starts up, the sections of starting resistor 2 are in series circuit relationship with the rotor but the rheostats 3, 4, and 5 are shunted out.

By this use of resistor 2, it will be readily obvious that a particular value of starting torque may be secured. I prefer to select resistance values for the sections of resistor 2 so as to give a high starting torque which is in the neighborhood of 400% of the full load torque of the motor, as shown in Fig. 2. While resistor 2 is shown as being of fixed resistance value, it will be readily apparent that the resistance value may be variable if so desired.

As the motor picks up speed, generator 22 will generate more and more current. Consequently, the coil of the transfer relay 36 will become energized to a greater and greater extent until a predetermined speed of generator 22 is attained, for example 300 R. P. M., at which time, relay 36 will pick up and effect closing of contact members 40 which will complete a circuit from bus Y through the "start" and "stop" pushbuttons, conductor 36, contact member 40, relay coil 41, to energized conductor 30. This will effect operation of contactor 43 which will effect shunting of the starting resistor 2 and opening of contact members 28. This has the effect of substituting the variable rheostats 3, 4, and 5 for the starting resistor 2. At lower speeds, such as in the neighborhood of 300 R. P. M., the mercury level in rheostats 3, 4, and 5 would be relatively low while that in rheostat 21 will be relatively high. As the initial motor speed adjustment is increased by virtue of the controlled movements of cam 14, the level of the mercury rheostats 3, 4, and 5, will gradually become raised so as to shunt more and more resistor sections while the level of the mercury in rheostat 21 is lowered to decrease the loading effect of generator 22 on motor 1.

It will be noted that relative adjustment of rheostat 3—4—5 and rheostat 21 may be secured by manually adjusting the threaded nuts 44 and 45. Presetting of resistance values is secured by virtue of a specific configuration of cam 14 or other similar cams. It will, therefore, become apparent that while the starting torque is the same, irrespective of the preset speed adjustments of the rheostats (about 400% full load torque), any one of a plurality of speed torque characteristics is attainable upon operation of the transfer relay 36 after the attainment of a predetermined speed, dependent upon the preset adjustment of the mercury level in the rheostats 3, 4, 5, and 21.

These operating characteristics are clearly shown in Fig. 2. An inspection of this figure will show that upon operation of the transfer relay 36 the speed torque characteristic may be any one of a plurality of curves, each of which is substantially linear by virtue of the cooperative progressive loading function of rheostat 21. In other words, good speed regulation is attainable at all speeds. Furthermore, I am able to obtain a very wide speed range, for example, from 450 to 1750 R. P. M. Furthermore, my novel control system provides a large number of easily obtainable control points by virtue of the use of the specific mercury rheostat construction shown. Furthermore, I am able to secure a very large starting torque, say about 400% of full load torque under all conditions with automatic transition to any preset speed of the motor.

Although the efficiencies of my system would appear to be somewhat lower for lower operating speeds, it is unusually high for high speed operation. Since about two-thirds of the operations of a hosiery knitting machine are performed at high speeds, the average efficiency is definitely higher than that obtained in various well-known systems shown in the prior art.

When it is desired to stop the machine and motor 1, the "stop" pushbutton is depressed, effecting interruption of the circuit to the actuating coil 23 which, in turn, effects interruption of the supply to the stator of the motor. As contactor 24 drops out, it will effect closing of contact members 46 which will insert a dynamic braking resistor 47 in series with the generator 22 effecting dynamic braking action on the generator which will aid in bringing the motor 1 to rest.

In accordance with my novel control system, I am able to secure a relatively wide speed range having good speed regulation at all speeds. I am also able to greatly simplify a control system greatly minimizing the number of contactors in considerably decreasing the size of the required rheostat and the motor and loading generator. I am also able to eliminate the necessity of complicated mechanical brush shifting devices such as used in the prior art, and at the same time, it is possible to secure a very simple and inexpensive device which is highly reliable in operation and which has an unusually high over-all operating efficiency as compared to similar devices known in the prior art.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. A speed control system for a variable speed machine, comprising, an induction motor for driving the machine, variable resistance means in the rotor circuit of said induction motor, a generator mechanically coupled to said motor including a variable resistance means in series circuit therewith, and means for simultaneously and progressively varying both of said resistance means in an inverse manner, for selectively varying the speed of said motor.

2. A drive system for a variable speed machine, comprising, a wound rotor induction motor for driving the machine, a variable resistor for varying the resistance of the rotor circuit of said motor to vary the motor speed only in the upper part of the speed range, a starting resistor, relay means for inserting said starting resistor in the rotor and shunting out said variable resistor during starting of said motor, and relay means responsive to a predetermined sub-normal speed of said motor for substituting said variable resistor for said starting resistor, a variable loading means coupled to said motor, variable resistor means permanently connected in circuit relation thereto throughout the entire speed range of said motor, and means for progressively and simultaneously varying the value of both of said variable resistor means to vary the speed throughout the entire speed range of said motor.

3. A system as set forth in claim 2 in which said last mentioned means comprises a chamber containing an electrically conducting liquid and a multiplicity of contacts insulatingly mounted longitudinally on the wall thereof which contacts are tapped to spaced portions of said variable resistor means, the level of said mercury being manually adjustable to give a preset resistance value and automatically operable by said machine.

4. A system as set forth in claim 2 in which said variable loading means comprises a direct current, series generator mechanically coupled to said motor.

5. A drive system for a variable speed machine, comprising, a wound rotor induction motor for driving the machine, a variable resistor for varying the resistance of the rotor circuit of said motor to vary the motor speed in the operating speed range, a starting resistor, relay means for inserting said starting resistor in the rotor and shunting out said variable resistor during starting of said motor, and relay means responsive to a predetermined subnormal speed of said motor for substituting said variable resistor for said starting resistor, said variable resistor comprising a chamber containing mercury and having a plurality of insulatingly mounted contact members longitudinally spaced along the wall of the chamber, a resistor, said contact members being tapped at spaced portions of said resistor, and means automatically controllable by said machine for automatically varying the level of said mercury in accordance with a predetermined pattern for correspondingly varying the speed of said motor.

6. A speed control system for a variable speed machine, comprising, in combination, an induction motor for driving the machine, variable impedance means in the rotor circuit of said induction motor including an impedance, a conducting fluid containing chamber having a multiplicity of contact elements, insulated from one another, and tapped at a multiplicity of different points on said impedance, means controlled by said machine for controlling the height of the fluid column in said chamber thereby controlling the value of impedance in said rotor circuit and the speed of said motor, and a variable loading means mechanically coupled to said rotor including a variable impedance for varying the loading effect thereof, and means for simultaneously and progressively varying both of said impedances for selectively varying the speed of said motor.

7. A speed control system for a variable speed machine, comprising, in combination, an induction motor for driving the machine, variable impedance means in the rotor circuit of said induction motor including an impedance, a conducting fluid containing chamber having a multiplicity of contact elements, insulated from one another, and tapped at a multiplicity of different points on said impedance, means controlled by said machine for controlling the height of the fluid column in said chamber thereby controlling the value of impedance in said rotor circuit and the speed of said motor, means coupled to said motor for imposing a variable load thereon, a second variable impedance means similar to said first impedance means for varying the loading of said variable loading means, and means for simultaneously and inversely varying both said impedance means for varying the speed of said motor throughout the entire speed operating range thereof.

8. A drive system for a variable speed machine, comprising, a wound rotor induction motor for driving the machine, a variable resistor for varying the resistance of the rotor circuit of said motor to vary the motor speed only in the upper part of the speed range, a starting resistor, relay means for inserting said starting resistor in the rotor and shunting out said variable resistor during starting of said motor, and relay means responsive to a predetermined sub-normal speed of said motor for substituting said variable resistor for said starting resistor, said variable resistor compriing a plurality of chambers each containing mercury and each having a plurality of insulatingly mounted contact members vertically spaced along the walls of said chambers, a resistor associated with each chamber being tapped at spaced portions thereof by the respective contact members of said chambers, common operating means for simultaneously adjusting the level of mercury in all of said chambers for acquiring selective preset speed-torque characteristics of said motor upon operation of said relay means, and a variable loading means responsive to the speed of said motor which is also operable by said common operating means for automatically loading said motor in proportion to the speed thereof.

9. A drive system for a variable speed machine, comprising, a wound rotor induction motor for driving the machine, a variable resistor for varying the resistance of the rotor circuit of said motor to vary the motor speed only in the upper part of the speed range, a starting resistor, relay means for inserting said starting resistor in the rotor and shunting out said variable resistor during starting of said motor, and relay means responsive to a predetermined subnormal speed of said motor for substituting said variable resistor for said starting resistor, said variable resistor comprising a plurality of chambers each containing mercury and each having a plurality of insulatingly mounted contact members vertically spaced along the walls of said chambers, a resistor associated with each chamber being tapped at spaced portions thereof by the respective contact members of said chambers, common operating means for simultaneously adjusting the level of mercury in all of said chambers for acquiring selective preset speed-torque characteristics of said motor upon operation of said relay means, and a variable loading means responsive to the speed of said motor which is also operable by said common operating means for automatically loading said motor in proportion to the speed thereof, said variable loading means comprising a series generator mechanically coupled to said motor and having a series resistor of the mercury actuated type as set forth in connection with said aforementioned variable resistor means, which series resistor is also simultaneously actuable by said common operating means to progressively insert resistance in the generator series circuit while progressively shunting out said aforementioned variable resistance means in the motor rotor circuit, thereby progressively varying the speed of said motor.

10. A speed control system for a variable speed machine, comprising, in combination, an induction motor for driving the machine, variable impedance means in the rotor circuit of said induction motor including an impedance, a conducting fluid containing chamber having a multiplicity of contact elements, insulated from one another, and tapped at a multiplicity of different points on said impedance, means controlled by said machine for controlling the height of the fluid column in said chamber thereby controlling the value of impedance in said rotor circuit and the speed of said motor, and a variable electric loading means applied to said rotor and means for simultaneously and progressively varying said loading means and said impedance means.

11. A speed control system for a variable speed machine, comprising, an induction motor for driving the machine, variable resistance means in the rotor circuit of said induction motor, means coupled to said motor for imposing a variable load thereon, a second variable resistance means similar to said first resistance means for varying the loading of said variable loading means, and means for simultaneously and inversely varying both said resistance means for varying the speed of said motor throughout the entire speed operating range thereof.

CHESTER W. DRAKE.